United States Patent
Ueda et al.

(10) Patent No.: US 8,200,452 B2
(45) Date of Patent: Jun. 12, 2012

(54) ATTITUDE-ANGLE DETECTING APPARATUS AND ATTITUDE-ANGLE DETECTING METHOD

(75) Inventors: Akihiro Ueda, Toyota (JP); Iwao Maeda, Nagoya (JP); Kiyomi Nagamiya, Nissin (JP); Naoto Shibata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 634 days.

(21) Appl. No.: 12/306,013

(22) PCT Filed: Jun. 25, 2007

(86) PCT No.: PCT/JP2007/062707
§ 371 (c)(1),
(2), (4) Date: Dec. 22, 2008

(87) PCT Pub. No.: WO2007/148818
PCT Pub. Date: Dec. 27, 2007

(65) Prior Publication Data
US 2009/0326858 A1   Dec. 31, 2009

(30) Foreign Application Priority Data
Jun. 23, 2006   (JP) ................................. 2006-173964

(51) Int. Cl.
*G01P 15/00* (2006.01)
*G01C 9/00* (2006.01)

(52) U.S. Cl. .......... 702/141; 702/85; 702/104; 702/105; 702/142; 702/145; 702/151; 701/1; 701/38; 701/70; 701/72; 318/58; 318/61; 318/64; 318/90; 303/146; 303/147; 180/197

(58) Field of Classification Search ............ 702/85, 702/104, 105, 141, 142, 145; 701/1, 38, 701/70, 72; 318/58, 61, 64, 90, 259, 651; 303/146, 147; 180/197
See application file for complete search history.

(56) References Cited

U.S. PATENT DOCUMENTS

| | | | |
|---|---|---|---|
| 6,338,012 B2 * | 1/2002 | Brown et al. | 701/1 |
| 2007/0146323 A1 * | 6/2007 | Nishikata et al. | 345/158 |
| 2009/0177425 A1 * | 7/2009 | Sugihara et al. | 702/85 |

FOREIGN PATENT DOCUMENTS

JP    7-83659    3/1995

(Continued)

*Primary Examiner* — Sujoy Kundu
(74) *Attorney, Agent, or Firm* — Finnegan, Henderson, Farabow, Garrett & Dunner, LLP

(57) ABSTRACT

To provide an attitude-angle detecting apparatus, which detects an attitude angle of a mobile object during movement with good accuracy by correcting an output value from an acceleration sensor, and to provide a method for the same. It is characterized in that it comprises an acceleration sensor for measuring an acceleration being applied to a mobile object, a yaw-rate sensor for measuring a yaw rate of the mobile object, a speed sensor for measuring a speed of the mobile object, a mobile-component acceleration calculating means for calculating an actual acceleration from the speed, calculating a centrifugal force from the yaw rate and the speed and calculating a mobile-component acceleration, a resultant force of the actual speed and the centrifugal force, and an attitude-angle calculating means for calculating an attitude angle from a gravitational acceleration, which is obtainable by correcting the acceleration with the mobile-component acceleration.

6 Claims, 3 Drawing Sheets

FOREIGN PATENT DOCUMENTS

| | | |
|---|---|---|
| JP | 8-178687 | 7/1996 |
| JP | 9-5104 | 1/1997 |
| JP | 9-318382 | 12/1997 |
| JP | 11-230742 | 8/1999 |
| JP | 2001-213300 | 8/2001 |
| JP | 2001-356014 | 12/2001 |
| JP | 2003-139536 | 5/2003 |

* cited by examiner

ATTITUDE-ANGLE DETECTING APPARATUS AND ATTITUDE-ANGLE DETECTING METHOD

CROSS-REFERENCE TO RELATED APPLICATIONS

This application is a national phase application of International Application No. PCT/JP2007/062707, filed Jun. 25, 2007, and claims the priority of Japanese Application No. 2006-173964, filed Jun. 23, 2006, the contents of both of which are incorporated herein by reference.

TECHNICAL FIELD

The present invention relates to an apparatus for detecting an attitude angle of mobile object, and a method for the same.

BACKGROUND ART

As one type of apparatuses (navigation apparatuses) for knowing the position of mobile object, such as vehicle, itself, and the speed thereof, there has been an inertial navigation system (INS) that does not require the help of ground facilities. An inertia sensor, which is employed for this INS, comprises an acceleration sensor for detecting the change of speed, and a gyroscope for detecting the change of attitude. The INS can know its own position and speed by accumulating the changes of speed and attitude from those of a departure point using an inertia sensor.

In order to specify the attitudinal state of mobile object, an orthogonally 3-axis coordinate system, in which the front/rear (axis) direction of mobile object is designated an x (roll) axis, the right/left (axis) direction is designated a y (pitch) axis and the up/down (axis) direction is designated a z (yaw) axis, has been used usually. When a mobile object is placed on a horizontal ground surface, it is assumed that the mobile object's yaw axis is directed to the vertical axis of the earth (Z axis) virtually, and that the roll axis and pitch axis become parallel to a local horizontal surface of the earth (X-Y plane) virtually. And, the attitude angle is expressed with three angles, a pitch angle, an angle that that the roll axis inclines from the local horizontal-surface X-axis, a roll angle, an angle that the pitch axis inclines from the local horizontal-surface Y-axis, and a yaw angle, an angle that the roll axis or pitch angle deviates on the X-Y plane. In order to measure these three angles, a 3-axis gyroscope has been used.

For example, in the invention of Patent Literature No. 1 an attitude angle is calculated by carrying out weighting to the output values of 3-axis gyroscope and acceleration sensor, respectively. The output results of the gyroscope are integrated for detecting an attitude angle. However, in gyroscopes, such a phenomena (drift) is present that they output errors in the same direction as the elapse of time, and accordingly the errors have become accumulated when integrating values that involve errors. In addition to above, since gyroscopes are expensive, a method is available in order to satisfy the functions at low cost, method in which gravity is detected with an acceleration sensor to calculate an attitude angle.

In the invention of Patent Literature No. 2, an attitude angle of mobile object is detected based on the output results of two acceleration sensors. However, since the outputs of the acceleration sensors involve accelerations being accompanied by the movement of the mobile object, it is difficult to detect the attitude angle accurately by the invention disclosed in Patent Literature No. 2.

Patent Literature No. 1: Japanese Unexamined Patent Publication (KOKAI) Gazette No. 8-178,687; and Patent Literature No. 2: Japanese Unexamined Patent Publication (KOKAI) Gazette No. 2003-139,536

DISCLOSURE OF THE INVENTION

Assignment to be Solved by the Invention

The present invention is one which has been done in view of the aforementioned problems, and it is an object to provide an attitude-angle detecting apparatus, which detects an attitude angle of mobile object during movement with good accuracy by correcting output values from an acceleration sensor, and a method for the same.

Means for Solving the Assignment

Since it is less likely to precisely detect an attitude angle of mobile object during movement by calculating the attitude angle only from an acceleration being applied to the mobile object, the present inventors had focused on the fact that component forces (a centrifugal force, and the like) of the acceleration, which is relevant to the movement of the mobile object, are obtainable from the speed or angular speed of the mobile object, and thereby completed the present invention.

An attitude-angle detecting apparatus according to the present invention is characterized in that it comprises:

an acceleration sensor for measuring an acceleration being applied to a mobile object;

a yaw-rate sensor for measuring a yaw rate of the mobile object;

a speed sensor for measuring a speed of the mobile object;

a mobile-component acceleration calculating means for calculating an actual acceleration from the speed, calculating a centrifugal force from the yaw rate and the speed, and calculating a mobile-component acceleration, a resultant force of the actual acceleration and the centrifugal force; and an attitude-angle calculating means for calculating an attitude angle from a gravitational acceleration, which is obtainable by correcting the acceleration with the mobile-component acceleration.

In the attitude-angle detecting apparatus according to the present invention, the acceleration sensor measures an acceleration being applied to the mobile object in three directions, the roll-axis direction, the pitch-axis direction and the yaw-axis direction, and the yaw-rate sensor measures a yaw rate (angular speed) with respect to the rotation of the mobile object in the yaw-axis direction. And, an acceleration (momentum) concerning the movement (motion) of the mobile object is found from the speed thereof by means of calculation, and is adapted into an actual acceleration. Similarly, a centrifugal force being relevant to the mobile object is calculated using the speed of the mobile object and the yaw rate. The actual acceleration and centrifugal force are accelerations (mobile-component acceleration) that a rise by means of the movement of the mobile object, and are included in the acceleration being obtained by the acceleration sensor. Hence, a momentum concerning the movement of the mobile object is removed by getting rid of the mobile-component acceleration from the acceleration, and thereby a gravitational acceleration is obtainable. And, an attitude angle is findable using the gravitational acceleration.

In the attitude-angle detecting apparatus according to the present invention, since the accelerations of the mobile object in the orthogonal three axes and the speed of the mobile object are detected, it is possible to find an attitude angle of the mobile object by using one gyroscope for detecting the yaw angle alone. Consequently, it is possible to reduce the number of expensive gyroscopes. However, not limiting the quantity of gyroscopes to one, but using them in the orthogonal three axes and detecting an attitude angle of the mobile object from the accelerations and speeds make it possible to obtain a more accurate detection outcome. Moreover, not using the output results of the speed sensor and acceleration sensor as they are for the detection of an attitude angle, but calculating an acceleration (momentum) being accompanied by the movement of the mobile object and getting rid of it from the acceleration of the acceleration sensor make it possible to calculate an attitude angle accurately.

It is preferable that the attitude-angle calculating means being used in the attitude-angle detecting apparatus according to the present invention can comprise: a gravitational-acceleration calculating means for calculating the gravitational acceleration in which the mobile-component acceleration is removed from the acceleration; a roll-angle calculating means for calculating a roll angle of the mobile object from the gravitational acceleration; and a pitch-angle calculating means for calculating a pitch angle of the mobile object from the gravitational acceleration. An attitude angle of the mobile object is expressed with the roll angle and the pitch angle. Since the gravitational accelerations in the respective directions are found at the gravitational-acceleration calculating means, it is possible to calculate the roll angle from the gravitational acceleration in the pitch-axis direction and the pitch angle from the gravitational acceleration in the roll-axis direction. Since it is possible to find an attitude angle of the mobile object for the roll angle and the pitch angle using these gravitational component forces, it is possible to detect the attitude angle more accurately.

It is preferable that the mobile-component calculating means being used in the attitude-angle detecting apparatus according to the present invention can comprise: a front/rear-axis acceleration calculating means for calculating the actual acceleration by differentiating the speed with time, thereby adapting it into a frontward/rearward component force of the mobile-component acceleration; a right/left-axis acceleration calculating means for calculating a centrifugal force from said yaw rate and the speed, thereby adapting it into a rightward/leftward component force of the mobile-component acceleration; and an up/down-axis acceleration calculating means for calculating a component force of the centrifugal force in the up/down direction of the mobile object, thereby adapting it into an upward/downward component force of the mobile-component acceleration. The mobile-component acceleration is a momentum concerning the movement (motion) of the mobile object, and is expressed in terms of component forces that correspond to the orthogonal three axes of the mobile object. Hence, for the purpose of detecting an attitude angle of the mobile object, it is possible to find the gravitational acceleration more accurately by finding it for each of the orthogonal three axes of the mobile object and then getting rid of them from the acceleration that is relevant to the mobile object.

It is preferable that the calculation of the centrifugal force at the up/down-axis speed calculating means being used in the attitude-angle detecting apparatus according to the present invention can be carried out based on the roll angle or the pitch angle that is calculated by the attitude-angle calculating means; and the attitude-angle calculating means can calculate at least one of the roll angle and the pitch angle based on a component force of the centrifugal force being calculated. It is possible to find an attitude angle of the mobile object more accurately by carrying out the calculation of a component force of the centrifugal force based on the roll angle or the pitch angle at the up/down-axis speed calculating means and then reflecting the component force of the centrifugal force in the calculation of the pitch angle or the roll angle thereat.

An attitude-angle detecting method according to the present invention is characterized in that it comprises:

a measuring step of measuring an acceleration being applied to a mobile object, a yaw rate of the mobile object, and a speed of the mobile object;

a mobile-component acceleration calculating step of calculating an actual acceleration from the speed, calculating a centrifugal force from the yaw rate and the speed, and calculating a mobile-component acceleration, a resultant force of the actual acceleration and the centrifugal force; and an attitude-angle calculating step of calculating an attitude angle from a gravitational acceleration, which is obtained by correcting the acceleration with the mobile-component acceleration.

In the attitude-angle detecting method according to the present invention, an acceleration sensor measures an acceleration being applied to a mobile object in three directions, the roll-axis direction, the pitch-axis direction and the yaw-axis direction, and a yaw-rate sensor measures a yaw rate with respect to the rotation of the mobile object in the yaw-axis direction. And, an acceleration concerning the movement of the mobile object is found from the speed thereof by means of calculation, and is adapted into an actual acceleration. Similarly, a centrifugal force being relevant to the mobile object is calculated using the speed of the mobile object. The actual acceleration and centrifugal force are accelerations (mobile-component acceleration) that arise by means of the movement of the mobile object, and are included in the acceleration being obtained by the acceleration sensor. Hence, a momentum concerning the movement of the mobile object is removed by getting rid of the mobile-component acceleration from the acceleration, and thereby a gravitational acceleration is obtainable. And, an attitude angle is findable using the gravitational acceleration.

In the attitude-angle detecting method according to the present invention, since it is possible to find an attitude angle of the mobile object by detecting the speed of the mobile object and the accelerations thereof in the orthogonal three axes, that is, with only one gyroscope for detecting the yaw angle alone, it is possible to reduce the number of expensive gyroscopes. Moreover, not using the output results of the speed sensor and acceleration sensor as they are for the detection of an attitude angle, but calculating an acceleration being accompanied by the movement of the mobile object and getting rid of it from the acceleration of the acceleration sensor make it possible to calculate an attitude angle accurately.

It is preferable that the attitude-angle calculating step being used in the attitude-angle detecting method according to the present invention can comprise: a gravitational-acceleration calculating step of calculating said gravitational acceleration in which the mobile-component acceleration is removed from the acceleration; a roll-angle calculating step of calculating a roll angle of the mobile object from the gravitational acceleration; and a pitch-angle calculating step of calculating a pitch angle of the mobile object from the gravitational acceleration. An attitude angle of the mobile object is expressed with the roll angle and the pitch angle. Since the gravitational accelerations in the respective directions are found at the gravitational-acceleration calculating step, it is possible to calculate the roll angle from the gravitational acceleration in the pitch-axis direction and the pitch angle from the gravitational acceleration in the roll-axis direction. Since it is possible to find an attitude angle of the mobile object for the roll angle and the pitch angle using these gravitational component forces, it is possible to detect the attitude angle more accurately.

It is preferable that the mobile-component acceleration calculating step being used in the attitude-angle detecting method according to the present invention can comprise: a front/rear-axis acceleration calculating step of calculating the actual acceleration by differentiating said speed with time, thereby adapting it into a frontward/rearward component force of the mobile-component acceleration; a right/left-axis acceleration calculating step of calculating a centrifugal force from the yaw rate and the speed, thereby adapting it into a rightward/leftward component force of the mobile-component acceleration; and an up/down-axis acceleration calculating step of calculating a component force of the centrifugal force in the up/down direction of the mobile object, thereby adapting it into an upward/downward component force of the mobile-component acceleration. The mobile-component acceleration is a momentum concerning the movement (motion) of the mobile object, and is expressed in terms of component forces that correspond to the orthogonal three axes of the mobile object. Hence, for the purpose of detecting an attitude angle of the mobile object, it is possible to find the gravitational acceleration more accurately by finding it for each of the orthogonal three axes of the mobile object and then getting rid of them from the acceleration that is relevant to the mobile object.

The gravitational-acceleration calculating step being used in the attitude-angle detecting method according to the present invention can be a step of calculating the gravitational acceleration while dividing it into front/rear-axis-direction, right/left-axis-direction and up/down-axis-direction component forces, and calculating a part of the respective component forces based on the roll angle or the pitch angle that is calculated at one of the roll-angle calculating step and the pitch-angle calculating step. And, it is preferable that one of the roll-angle calculating step and the pitch-angle calculating step can be a step of calculating the roll angle or the pitch angle based on a reminder of the respective component forces; and the other one of the roll-angle calculating step and the pitch-angle calculating step can be a step of calculating the roll angle or the pitch angle based on a part of or all of the respective component forces. In the attitude-angle detecting method according to the present invention, since the roll angle and the pitch angle are calculated, the component forces of the gravitational acceleration in the respective axial directions, component forces which are calculated at the gravitational-acceleration calculating step, are calculated based on the roll angle or the pitch angle. Thus, since the component forces of the gravitational acceleration are reflected in the calculation of the pitch angle and roll angle, it is possible to find an attitude angle of the mobile object more accurately.

Effect of the Invention

In accordance with the attitude-angle detecting apparatus according to the present invention and the attitude-angle detecting method for the same, since they function, not using expensive gyroscopes for all of the orthogonal three axes but using even one of them therefor, it is possible to detect a mobile object's attitude angle at low cost. Moreover, since an angular speed (yaw rate) is used as the output of a gyroscope, and accordingly since values that involve errors resulting from the draft of the gyroscope are not used for calculations, it is possible to detect the attitude angle accurately.

And, since the output values of an acceleration sensor are not used as they are for calculations, but since a gravitational acceleration is found, gravitational acceleration from which an acceleration concerning the motion of a mobile object is gotten rid of, it is possible to detect an attitude angle accurately even when the mobile object is moving.

EXPLANATION ON REFERENCE NUMERALS

1: Attitude-angle Detecting Apparatus;
2: Acceleration Sensor;
3: Yaw-rate Sensor;
4: Speed Sensor;
5: Mobile-component Acceleration Calculating Means;
6: Attitude-angle Calculating Means;
7: Mobile Object;
51: Front/rear-axis Acceleration Calculating Means;
52: Right/left-axis Acceleration Calculating Means;
53: Up/down-axis Acceleration Calculating Means;
61: Gravitational-acceleration Calculating Means;
62: Roll-angle Calculating Means;
63: Pitch-angle Calculating Means;
71: Pitch Angle;
72: Role Angle;
73: Yaw Angle;
81: Up/down-axis of Mobile Object 7 (Yaw-axis);
82: Front/rear-axis of Mobile Object 7 (Roll-axis);
83: Right/left-axis of Mobile Object 7 (Pitch-axis);
91: Vertical Axis of Earth (Z-axis);
92: Local Horizontal-surface X-axis;
93: Local Horizontal-surface Y-axis;
94: Horizontal Surface of Earth (X-Y Plane)

BEST MODE FOR CARRYING OUT THE INVENTION

Hereinafter, the present invention will be explained using an embodiment.

Embodiment

Figure 1:
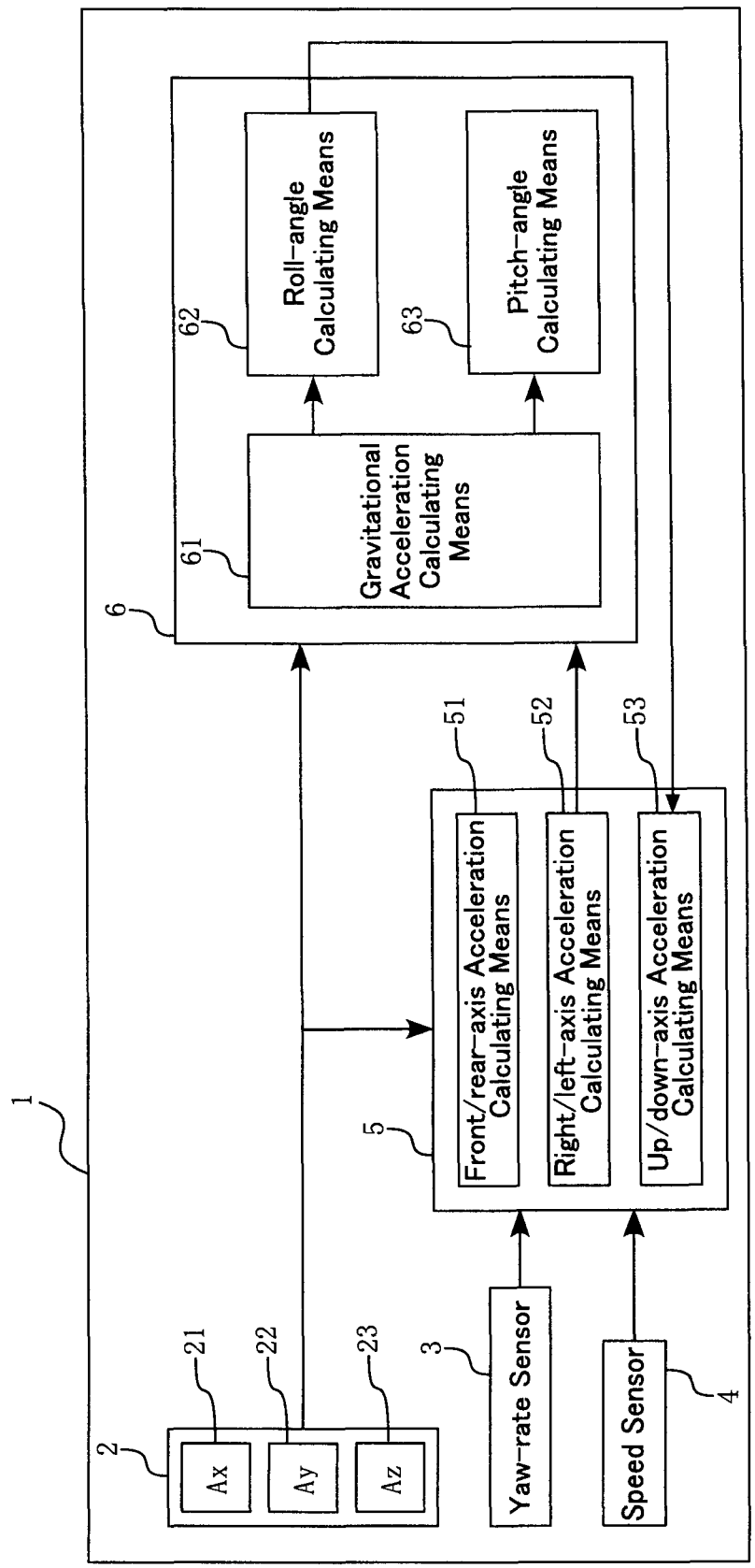
FIG. 1 is a construction diagram of an attitude-angle detecting apparatus according to a present embodiment.

FIG. 1 is a construction diagram of an attitude-angle detecting apparatus according to a present embodiment.

An attitude-angle detecting apparatus 1 comprises an acceleration sensor 2, a yaw-rate sensor 3, a speed sensor 4, a mobile-component acceleration calculating means 5, and an attitude-angle calculating means 6. The mobile-component acceleration calculating means 5, and the attitude-angle calculating means 6 are materialized as logics on a computer.

Figure 2:
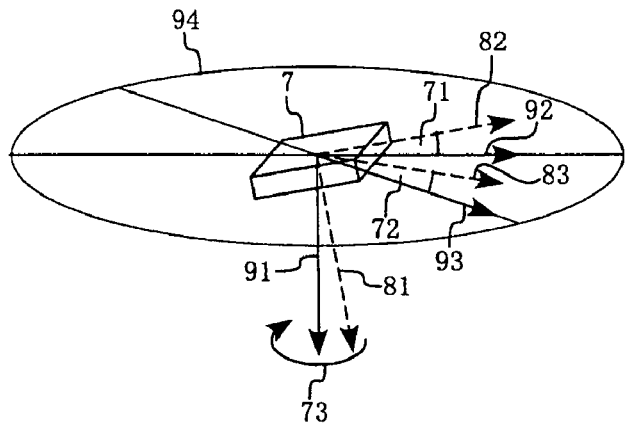
FIG. 2 is a diagram for illustrating absolute axes and relative axes that are used in the attitude-angle detecting method according to the present embodiment and a method for the same.

As illustrated in FIG. 2, a mobile object 7 to which the attitude-angle detecting apparatus 1 is installed is made so that an up/down-axis 81 (yaw-axis) of the mobile object 7 is directed to the vertical axis 9 of the earth (Z-axis) virtually; and a front/rear-axis 82 (roll-axis) of the mobile object 7, and a right/left-axis (pitch axis) 83 thereof are parallel to a horizontal surface 94 (X-Y plane) of the earth virtually, when the mobile object 7 is placed on a horizontal ground. An angle that the roll axis 82 of the mobile object 7 inclines from a local horizontal-surface X-axis 92 is designated a pitch angle 71; an angle that the roll axis 83 inclines from a local horizontal-surface Y-axis 93 is designated a roll angle 72; an angle that the roll axis 82 or the pitch angle 83 deviates on the X-Y plane is designated a yaw angle 73; and an attitude angle of the mobile object 7 is expressed with the three angles.

The acceleration sensor 2 comprises Ax21, Ay22 and Az23 for measuring accelerations in the orthogonal three axes, the roll-axis 82, the pitch-axis 83 and the yaw-axis 81, respectively. The acceleration sensor 2 measures the accelerations of the mobile object, and then outputs them to the mobile-component acceleration calculating means 5, and to the attitude-angle calculating means 6. The acceleration sensor 2 is put into place so that the roll-axis 82 of the orthogonal three axes coincides with the front/rear direction of the mobile object 7; the pitch-axis 83 coincides with the right/left direction of the mobile object 7; and the yaw-axis 81 coincides with the up/down direction of the mobile object 7, and rotates simultaneously with the rotation of the mobile object 7.

The yaw-rate sensor 3 is a gyroscope, which measures an angular speed of the yaw-axis 81, the up/down-axis of the mobile object 7, and then outputs it to the mobile-component acceleration calculating means 5. The speed sensor 4 is a means for measuring a speed of the mobile object 7 and then outputting it to the mobile-component acceleration calculating means 5. When the mobile object is a vehicle, it measures a wheel speed.

The mobile-component acceleration calculating means 5 is a means for measuring accelerations, which are relevant to a movement of the mobile object 7, for every axis of the orthogonal three axes based on the yaw rate and speed that are input from the yaw-rate sensor 3 and speed sensor 4; and comprises a front/rear-axis acceleration measuring means 51, a right/left-axis acceleration measuring means 52, and an up/down-axis acceleration measuring means 53. The mobile-component acceleration calculating means 5 outputs calculated outcomes to the attitude-angle calculating means 6.

The front/rear-axis acceleration calculating means 51 is a means for measuring a forward/rearward acceleration, which is relevant to the movement of the mobile object 7. The right/left-axis acceleration calculating means 52 is a means for measuring a rightward/leftward acceleration, which is relevant to the movement of the mobile object 7. The up/down-axis acceleration calculating means 53 is a means for measuring an upward/downward acceleration, which is relevant to the movement of the mobile object 7.

The attitude-angle calculating means 6 comprises a gravitational-acceleration calculating means 61, a roll-angle calculating means 62, and a pitch-angle calculating means 63. The gravitational-acceleration calculating means 61 is a means for calculating a corrected gravitational acceleration from the accelerations, which are input from the acceleration sensor 2, by correcting them using the mobile-component acceleration, which is input from the mobile-component acceleration calculating means 5. The roll-angle calculating means 62 is a means for calculating the roll angle 72 based on the gravitational acceleration that is input from the gravitational-acceleration calculating means 61. The pitch-angle calculating means 63 is a means for calculating the pitch angle 73 based on the gravitational acceleration that is input from the gravitational-acceleration calculating means 61.

Figure 3:
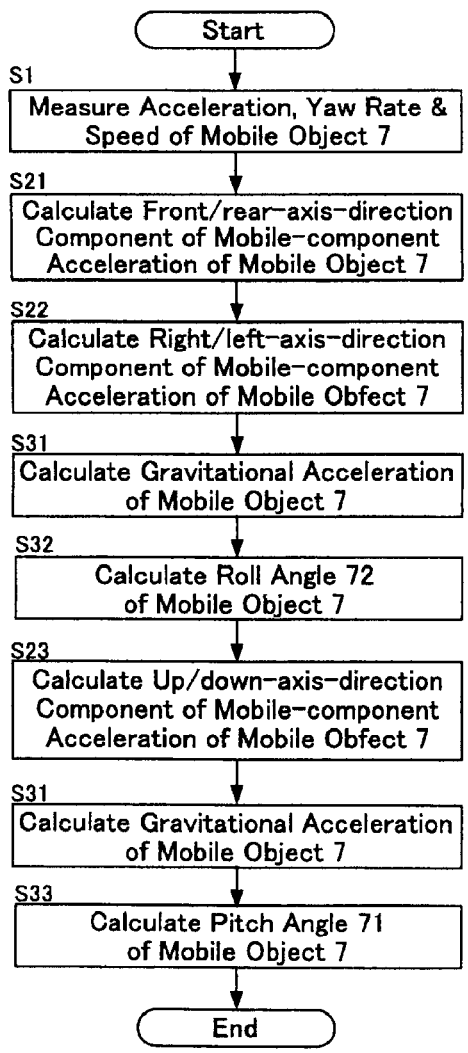
FIG. 3 is a flowchart of the attitude-angle detecting method according to the present embodiment.

FIG. 3 is one that illustrates an attitude-angle detecting method (or an attitude-angle detecting routine hereinafter) in a flowchart, attitude-angle detecting method which is used in the attitude-angle detecting apparatus 1 according to the present embodiment. The present routine is one that is executed for every predetermined time during a predetermined period after the attitude-angle detecting apparatus 1 is started up.

After the processing of the present routine begins, the acceleration sensor 2 measures an acceleration that is applied to the mobile object 7; the yaw-rate sensor 3 measures a yaw rate (ω); the speed sensor 4 measures a speed (Vw); and then they output them to the mobile-component acceleration calculating means 5, and to the attitude-angle calculating means 6 (measuring step S1). In the acceleration sensor 2, an acceleration in the roll-axis direction (Ax_sensor) is measured at Ax21; an acceleration in the pitch-axis direction (Ay_sensor) is measured at Ay22; and an acceleration in the yaw-axis direction (Az_sensor) is measured at Az23.

Next, the mobile-component acceleration calculating means 5 carries out the calculation of accelerations (mobile-component accelerations), which concern a movement (motion) that is relevant to the mobile object 7, from the yaw rate and speed (mobile-component acceleration calculating step).

And, the attitude-angle calculating means 6 carries out the calculation of the roll angle (Roll) 72 and pitch angle (Pitch) 71 with the gravitational acceleration that is found by correcting the accelerations, which are measured at the acceleration sensor 2, with the mobile-component acceleration, which is input from the mobile-component acceleration calculating means 5 (attitude-angle calculating step).

The mobile-component acceleration measuring means 5 possesses a front/rear-axis acceleration calculating step S21 at which the front/rear-axis acceleration calculating means 51 calculates an actual acceleration by differentiating the speed (Vw) with time, thereby adapting it into a forward/rearward component force (Ax_cor) of the mobile-component acceleration. And, it possesses a right/left-axis acceleration calculating step S22 at which the right/left-axis acceleration calculating means 52 calculates a centrifugal force from the yaw rate (ω) and speed (Vw), thereby adapting it into a rightward/leftward component force (Ay_cor) of the mobile-component acceleration, and possesses an up/down-axis acceleration calculating step S23 at which the up/down-axis acceleration calculating means 53 calculates a component force of the centrifugal force in the up/down direction of the mobile object 7, thereby adapting it into an upward/downward component force (Az_cor) of the mobile-component acceleration.

The centrifugal force Ay_cor is obtainable with $$Ay\_cor = \text{Speed }(Vw) \times \text{Yaw Rate }(\omega). \quad \text{Equation (1),}$$

The upward/downward component force (Az_cor) of the mobile-component acceleration is calculated based on the Roll that is calculated by means of an attitude-angle calculating step of the attitude-angle calculating means 6.

In the attitude-angle calculating means 6, there are a gravitational-acceleration calculating step S31 of calculating a gravitational acceleration that the gravitational-acceleration calculating means 61 corrects the accelerations with the mobile-component acceleration, a roll-angle calculating step S32 of calculating the Roll of the mobile object 7 from the gravitational acceleration, and a pitch-angle calculating step S33 of calculating the Pitch of the mobile object 7 from the gravitational acceleration.

Figure 4:
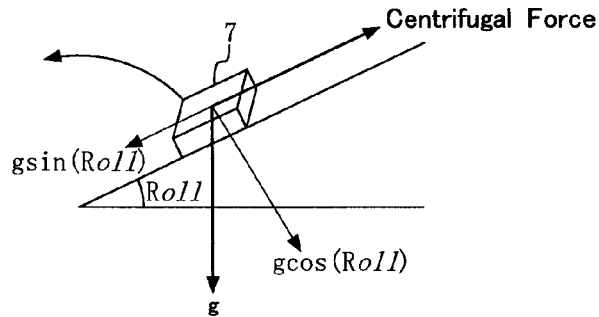
FIG. 4 is a diagram for illustrating a normal-bank state of a mobile object according to the present embodiment.
Figure 5:
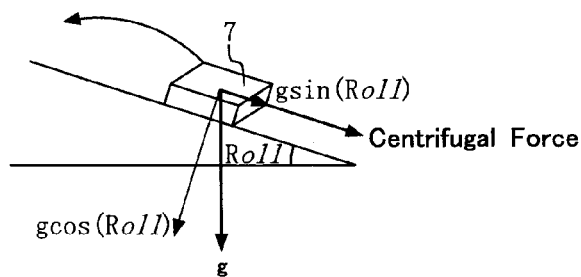
FIG. 5 is a diagram for illustrating a reverse-bank state of the mobile object according to the present embodiment.

At step S32, depending on directions in which the mobile object 7 inclines, the Ay_sensor is calculated with different mathematical formulas for the normal bank shown in FIG. 4, and for the reverse bank shown in FIG. 5.

In the case of normal bank:

$$Ay\_sensor = Ay\_cor - g \times \sin(Roll), \text{ where } g = \text{gravitational acceleration in that area} \quad \text{Equation (2),}$$

Figure 6:
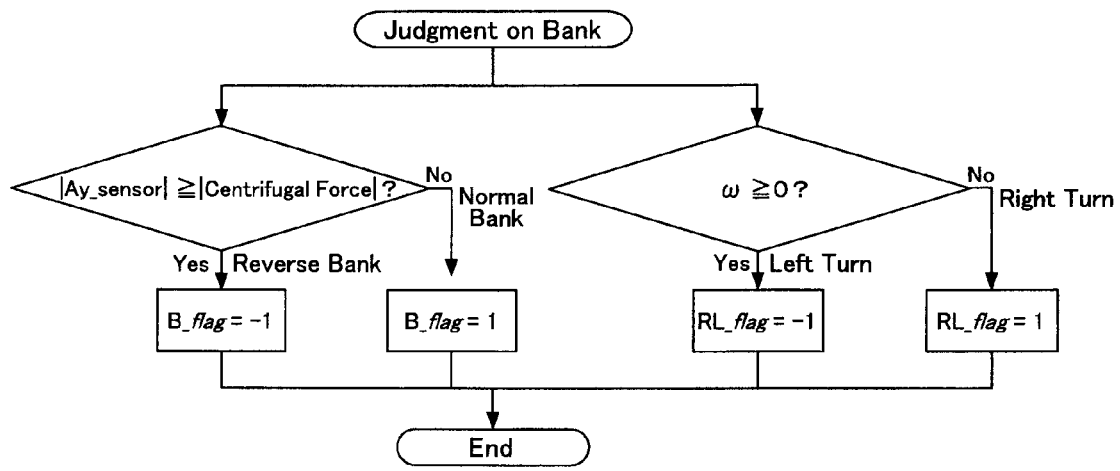
FIG. 6 is a flow chart for judging bank and turn, flowchart which is used in the attitude-angle detecting method according to the present embodiment.

In the case of reverse bank:

$$Ay\_sensor = Ay\_cor + g \times \sin(Roll), \text{ where } g = \text{gravitational acceleration in that area} \quad \text{Equation (3),}$$

g·sin(Roll) in Equation (2) and Equation (3) is a rightward/leftward component force of the mobile-component acceleration. When Equation (2) and Equation (3) are rearranged so as to find the rightward/leftward component force by transposing it, whether a centrifugal force is applied to or is subtracted from the measured Ay_sensor depends on directions in which the mobile object 7 inclines. Hence, as illustrated in FIG. 6, the magnitude of the Ay_sensor is compared with the magnitude of the centrifugal force; being a smaller centrifugal force means a normal bank; and being a greater centrifugal force means a reverse bank. When being a normal bank, 1 is taken as a value of bank flag (B_flag); and, when being a reverse bank, 1 is taken as a value thereof. Moreover, regarding turns of the mobile object 7, since acting directions of forces differ between the Ay_sensor and the centrifugal force whether it turns rightward or leftward, they are judged by means of the ω as shown in FIG. 6; when turning rightward, 1 is taken as a value of direction flag (RL_flag); and, when turning leftward, −1 is taken as a value thereof. Since g, the gravitational acceleration, is a constant, it is possible to calculate the Roll when the rightward/leftward component force can be found.

$$Roll = \sin^{-1}\{(|Ay\_sensor| - |Vw \times \omega|/g) \times RL\_flag \times B\_flag\} \quad \text{Equation (4):}$$

Next, at step S33, the Pitch is calculated from the gravitational acceleration in which the accelerations (Ax_sensor, Ay_sensor, and Az_sensor) are corrected by means of the mobile-component acceleration's respective component forces (Ax_cor, Ay_cor, and Az_cor) in the orthogonal three axes.

$$Pitch = \tan^{-}[(Ax\_sensor - Ax\_cor)/\{(Ay\_sensor - Ay\_cor)^2 + (Az\_sensor - Az\_cor)^2\}^{1/2}] \quad \text{Equation (5):}$$

The mobile-component acceleration's respective component forces (Ax_cor, Ay_cor, and Az_cor) in the orthogonal three axes have been found at steps S21, S22 and S23 of the mobile-component acceleration calculating means 5.

In accordance with the attitude-angle detecting apparatus 1 according to the present embodiment and the attitude-angle detecting method for the same, it is possible to detect the mobile object's attitude angle at low cost by using the acceleration sensor and speed sensor, without ever employing expensive gyroscopes for all of the orthogonal three axes. Moreover, since values that involve errors that the draft of the gyroscope accompanies are not used for calculations, it is possible to detect the attitude angle accurately.

And, since the output values of the acceleration sensor are not used as they are for calculations, but since the gravitational acceleration is found after getting rid of the accelerations concerning the mobile object's motion from them, it is possible to detect the attitude angle accurately even when the mobile object is moving.

So far, although one of the preferred embodiments according to the present invention has been explained, the present invention is not limited to the aforementioned embodiment. For example, when the mobile object is an automobile having wheels, and the like, it is possible to detect an attitude angle with much higher accuracy by measuring a wheel speed as for the mobile object's speed, and then by adding the mobile object's acceleration, which is calculated by means of the pitch angle and speed, to the way of finding the upward/downward component force of the component-force acceleration at the time of finding the Pitch. Moreover, when the mobile object is an airplane having no wheels, it is possible to think of measuring a propeller's revolution speed as the mobile object's speed.

INDUSTRIAL APPLICABILITY

The attitude-angle detecting apparatus and attitude-angle detecting method according to the present invention can be employed in the fields of industries, such as automobile industries and aeronautics industries, for instance.

The invention claimed is:

1. An attitude-angle detecting apparatus comprising:
an acceleration sensor for measuring an acceleration being applied to a mobile object;
a yaw-rate sensor for measuring a yaw rate of the mobile object;
a speed sensor for measuring a speed of the mobile object;
a mobile-component acceleration calculating means comprising:
a front/rear-axis acceleration calculating means for calculating an actual acceleration by differentiating the speed with time, thereby adapting it into a front/rear-axis-direction component force of a mobile-component acceleration; a right/left-axis acceleration calculating means for calculating a centrifugal force from the yaw rate and the speed, thereby adapting it into a right/left-axis-direction component force of the mobile-component acceleration; and an up/down-axis acceleration calculating means for calculating a component force of the centrifugal force in the up/down-axis direction of the mobile object, thereby adapting it into an up/down-axis-direction component force of the mobile-component acceleration; and
an attitude-angle calculating means for calculating an attitude angle from a gravitational acceleration, which is obtainable by correcting the acceleration with the mobile-component acceleration.

2. The attitude-angle detecting apparatus set forth in claim 1, wherein said attitude-angle calculating means comprises:
a gravitational-acceleration calculating means for calculating said gravitational acceleration in which said mobile-component acceleration is removed from said acceleration;
a roll-angle calculating means for calculating a roll angle of the mobile object from the gravitational acceleration; and
a pitch-angle calculating means for calculating a pitch angle of the mobile object from the gravitational acceleration.

3. The attitude-angle detecting apparatus set forth in claim 2, wherein:
the calculation of the component force of said centrifugal force at said up/down-axis acceleration calculating means is carried out based on said roll angle or said pitch angle that is calculated by said attitude-angle calculating means; and the attitude-angle calculating means calculates at least one of the roll angle and the pitch angle based on a component force of the centrifugal force being calculated.

4. An attitude-angle detecting method comprising:
a measuring step of measuring an acceleration being applied to a mobile object, a yaw rate of the mobile object, and a speed of the mobile object;
wherein the acceleration is measured with an acceleration sensor, the yaw rate is measured with a yaw-rate sensor, and the speed is measured with a speed sensor;
a mobile-component acceleration calculating step, performed via a mobile component acceleration calculator, comprising: a front/rear-axis acceleration calculating step of calculating an actual acceleration by differentiating the speed with time, thereby adapting it into a front/rear-axis-direction component force of a mobile-component acceleration; a right/left-axis acceleration calculating step of calculating a centrifugal force from the yaw rate and the speed, thereby adapting it into a right/left-axis-direction component force of the mobile-component acceleration; and an up/down-axis acceleration calculating step of calculating a component force of the centrifugal force in the up/down-axis direction of the mobile object, thereby adapting it into an up/down-axis-direction component force of the mobile-component acceleration; and
an attitude-angle calculating step of calculating an attitude angle from a gravitational acceleration, which is obtained by correcting the acceleration with the mobile-component acceleration,
wherein the attitude-angle calculating is performed via an attitude angle calculator.

5. The attitude-angle detecting method set forth in claim 4, wherein said attitude-angle calculating step comprises:
a gravitational-acceleration calculating step of calculating said gravitational acceleration in which said mobile-component acceleration is removed from said acceleration;
a roll-angle calculating step of calculating a roll angle of the mobile object from the gravitational acceleration; and
a pitch-angle calculating step of calculating a pitch angle of the mobile object from the gravitational acceleration.

6. The attitude-angle detecting method set forth in claim 4, wherein:
said gravitational-acceleration calculating step is a step of calculating said gravitational acceleration while dividing it into front/rear-axis-direction, right/left-axis-direction and up/down-axis-direction component forces, and calculating a part of the respective component forces based on said roll angle or said pitch angle that is calculated at one of said roll-angle calculating step and said pitch-angle calculating step;
one of the roll-angle calculating step and the pitch-angle calculating step is a step of calculating the roll angle or the pitch angle based on a reminder of the respective component forces; and
the other one of the roll-angle calculating step and the pitch-angle calculating step is a step of calculating the roll angle or the pitch angle based on a part of or all of the respective component forces.

* * * * *